US011396046B2

(12) United States Patent
Ugarte et al.

(10) Patent No.: US 11,396,046 B2
(45) Date of Patent: Jul. 26, 2022

(54) METHODS FOR ADDITIVELY MANUFACTURING COMPONENTS WITH REDUCED BUILD FAILURES CAUSED BY TEMPERATURE VARIATIONS

(71) Applicant: General Electric Company, Schenectady, NY (US)

(72) Inventors: Johnnattan Tennessee Ugarte, Mason, OH (US); John Eric Bloomberg, West Chester, OH (US); Xuefeng Zhang, Mason, OH (US); John William Moores, Cincinnati, OH (US); Justin Michael Stekli, Dayton, OH (US); Sameer Surendra Parasnis, Mason, OH (US); Jun Zheng Hu, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 184 days.

(21) Appl. No.: 16/273,513

(22) Filed: Feb. 12, 2019

(65) Prior Publication Data
US 2020/0254520 A1 Aug. 13, 2020

(51) Int. Cl.
*B22F 3/105* (2006.01)
*B22F 12/00* (2021.01)
(Continued)

(52) U.S. Cl.
CPC .............. *B22F 12/00* (2021.01); *B33Y 10/00* (2014.12); *B33Y 30/00* (2014.12); *B22F 10/10* (2021.01)

(58) Field of Classification Search
CPC ............ B22F 3/1055; B22F 2003/1056; B22F 12/00; B22F 10/10; B22F 10/20;
(Continued)

(56) References Cited

U.S. PATENT DOCUMENTS 7,045,738 B1 5/2006 Kovacevic et al.
9,399,321 B2 7/2016 Ljungblad
(Continued)

FOREIGN PATENT DOCUMENTS

DE 102013017792 A1 4/2015
DE 102018112302 A1 12/2018
(Continued)

OTHER PUBLICATIONS

European Extended Search Report for EP Application No. 20151492.4 dated Jul. 1, 2020 (8 pages).
(Continued)

*Primary Examiner* — Robert S Jones, Jr.
*Assistant Examiner* — Jiangtian Xu
(74) *Attorney, Agent, or Firm* — Dinsmore & Shohl LLP

(57) ABSTRACT

A method for additively manufacturing a component includes receiving, via an additive manufacturing system, a geometry of the component and melting and fusing, via an energy beam of the additive manufacturing system, material layer by layer atop a build platform according to the geometry so as to build up a plurality of layers that form the component. The method also includes determining a surface area change from one of the plurality of layers to the next based on the geometry. Further, the method includes temporarily discontinuing melting and fusing of the material by the energy beam between building of one or more of the plurality of layers so as to provide a delay after building one or more of the plurality of layers when the surface area change is above a predetermined threshold. As such, the delay allows for one or more previously built layers to at least partially cool so as to eliminate and/or reduce build failures from occurring in the final component.

13 Claims, 3 Drawing Sheets

(51) Int. Cl.
　　　*B33Y 10/00*　　　(2015.01)
　　　*B33Y 30/00*　　　(2015.01)
　　　*B22F 10/10*　　　(2021.01)

(58) Field of Classification Search
　　　CPC .......... B22F 10/30; B22F 10/40; B22F 10/00;
　　　　　　B33Y 10/00; B33Y 30/00; B33Y 50/02;
　　　　　　Y02P 10/25; B23K 15/0086; B23K
　　　　　　26/342; B29C 64/153; B29C 64/194;
　　　　　　B29C 64/393; B29C 64/40
　　　See application file for complete search history.

(56) References Cited

U.S. PATENT DOCUMENTS

| | | |
|---|---|---|
| 9,713,856 B2 | 7/2017 | Fockele |
| 9,751,260 B2 | 9/2017 | Dietrich et al. |
| 9,952,236 B2 | 4/2018 | Satzger et al. |
| 2016/0158889 A1 | 6/2016 | Carter et al. |
| 2016/0271884 A1* | 9/2016 | Herzog ................. B23K 15/02 |
| 2017/0189965 A1 | 7/2017 | Vaidya et al. |
| 2017/0216966 A1 | 8/2017 | DeMuth et al. |
| 2017/0252978 A1 | 9/2017 | Claes |
| 2018/0029306 A1 | 2/2018 | Gold et al. |
| 2018/0085994 A1* | 3/2018 | FrantzDale ........... B29C 64/135 |
| 2018/0169970 A1 | 6/2018 | Harding et al. |
| 2018/0200959 A1 | 7/2018 | Medeiros Araujo |
| 2018/0250746 A1* | 9/2018 | Symeonidis ......... B23K 26/123 |

FOREIGN PATENT DOCUMENTS

| | | |
|---|---|---|
| EP | 3213854 A1 | 9/2017 |
| EP | 3062991 B1 | 12/2018 |
| WO | 2015088852 A1 | 6/2015 |

OTHER PUBLICATIONS

First Office Action for China Application No. 202010087901.4 dated Nov. 2, 2021.

* cited by examiner

METHODS FOR ADDITIVELY MANUFACTURING COMPONENTS WITH REDUCED BUILD FAILURES CAUSED BY TEMPERATURE VARIATIONS

FIELD

The present disclosure relates generally to additively manufacturing and more particularly to methods for additively manufacturing components so as to reduce build failures in the final component caused by temperature variations during the build process.

BACKGROUND

Additive manufacturing (AM) processes generally involve the buildup of one or more materials to make a net or near net shape (NNS) object, in contrast to subtractive manufacturing methods. For example, during a particular type of AM process referred to as direct metal laser sintering (DMLS) or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

Parts built via DMLM typically have intricate geometries; therefore, heat constants throughout the volume of the part often vary due to geometric changes in the part. Further, a direct correlation exists between the area of each layer and the heat being added to build each layer. In other words, as layer area increases, the heat required to build such a layer also increases. As the heat added increases, the build quality of the part may be compromised, e.g. due to shrinkage, uneven builds between the layers, varying densities, color discrepancies, poor surface quality, etc.

Accordingly, a method for additively manufacturing components having reduced build failures caused by sudden changes of surface area due to temperature variations in the component would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a method for additively manufacturing a component. The method includes receiving, via an additive manufacturing system, a geometry of the component. The method also includes melting and fusing, via an energy beam of an energy source of the additive manufacturing system, material layer by layer atop a build platform of the component according to the geometry so as to build up a plurality of layers that form the component. The method also includes determining a surface area change from one of the plurality of layers to the next based on the geometry. Further, the method includes temporarily discontinuing melting and fusing of the material by the energy beam between building of one or more of the plurality of layers so as to provide a delay after building one or more of the plurality of layers when the surface area change is above a predetermined threshold. As such, the delay allows for one or more previously built layers to at least partially cool so as to eliminate and/or reduce build failures from occurring in the final component.

In another aspect, the present disclosure is directed to an additive manufacturing system. The additive manufacturing system includes at least one processor for receiving a geometry of a component, a build platform for supporting the component during manufacturing, and an energy source communicatively coupled to the processor(s). The energy source is configured to generate at least one energy beam that is adapted to melt and fuse material layer by layer atop the build platform according to the geometry so as to build up a plurality of layers that form the component. As such, the processor(s) is further configured to control the energy beam(s) during building of the component. More specifically, the energy beam(s) is configured to temporarily discontinue melting and fusing of the material by the energy beam between building of one or more of the plurality of layers so as to provide a delay after building one or more of the plurality of layers when the surface area change is above a predetermined threshold. As such, the delay allows for one or more previously built layers to at least partially cool so as to eliminate and/or reduce build failures from occurring in the final component.

In yet another aspect, the present disclosure is directed to a method for additively manufacturing a component. The method includes melting and fusing, via an energy beam generated by an energy source of an additive manufacturing system, material so as to build at least one first layer atop a build platform of the component. The method also includes determining a surface area change from the at least one first layer to a subsequent, second layer. Further, the method includes discontinuing melting and fusing of the material by the energy beam onto the first layer(s) so as to provide a delay after building of the first layer(s). Moreover, a length of the delay may be determined as a function of the surface area change so as to allow the at least one first layer to at least partially cool. After the delay, the method includes resuming melting and fusing of the material via the energy beam onto the at least one first layer so as to build the second layer, thereby forming the component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
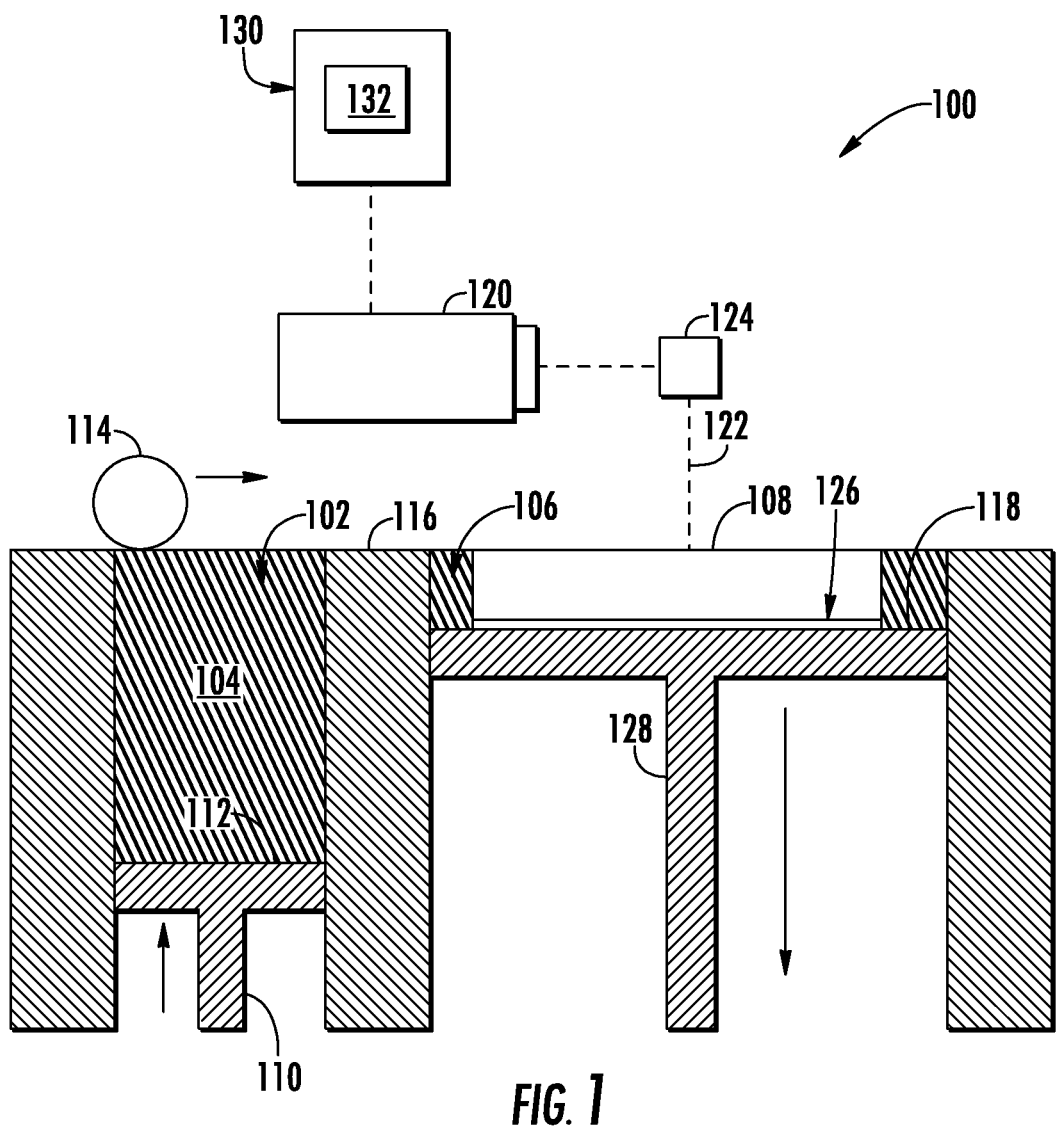
FIG. 1 illustrates a perspective view of one embodiment of an additive manufacturing system according to the present disclosure.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. In addition, as used herein, terms of approximation, such as "approximately," "substantially," or "about," refer to being within a ten percent margin of error.

As used herein, the terms "additively manufactured," "additive manufacturing techniques or processes" or similar generally refer to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present disclosure. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, and/or hybrid processes.

The additive manufacturing processes described herein may also be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to certain embodiments of the present disclosure, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys.

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Further, the additive manufacturing process disclosed herein allows a single component to be formed from multiple materials. Thus, the components described herein may be formed from any suitable mixtures of the above materials. For example, a component may include multiple layers, segments, and/or parts that are formed using different materials, processes, and/or on different additive manufacturing machines. In this manner, components may be constructed which have different materials and material properties for meeting the demands of any particular application.

Referring now to the drawings, FIG. 1 illustrates a schematic diagram of one embodiment of an additive manufacturing system 100 according the present disclosure. More specifically, the additive manufacturing system 100 is configured to fabricate a component 108 using three-dimensional (3D) information, for example, a 3D computer model of the component 108. Accordingly, a 3D design model of the component 108 may be defined prior to manufacturing and received within a controller 130 having at least one processor 132. In this regard, a model or prototype of the component 108 may be scanned to determine the 3D information of the component 108 and the information may be stored in the processor 132. As another example, a model of the component 108 may be constructed using a suitable computer aided design (CAD) program stored in the processor 132 to define the 3D design model of the component 108.

The design model may include 3D numeric coordinates of the entire configuration of the component 108 including both external and internal surfaces of the component 108. For example, the design model may define the body, the surface, and/or internal passageways such as openings, support structures, etc. In one embodiment, the 3D design model may be converted into a plurality of slices or segments, e.g., along a central (e.g., vertical) axis of the component 108 or any other suitable axis. Each slice may define a thin cross section (also referred to herein as a surface area or slice area) of the component 108 for a predetermined height of the slice. As such, the plurality of successive cross-sectional slices together form the 3D component 108. The component 108 can then be "built-up" slice-by-slice, or layer-by-layer, until finished as described herein.

For example, as shown, the additive manufacturing system 100 may include a powder bed fusion (PBF) system, such as a direct metal laser melting (DMLM) system, an electron beam melting (EBM) system, a selective laser melting (SLM) system, a directed metal laser sintering (DMLS) system, or a selective laser sintering (SLS) system. As such, the additive manufacturing system 100 builds components in a layer-by-layer manner by melting or fusing sequential layers of a powder material to one another. Each successive layer may be, for example, between about 10 µm and 200 µm, although the thickness may be selected based on any number of parameters and may be any suitable size according to alternative embodiments. Therefore, utilizing the additive formation methods described herein, the components described herein may have cross sections as thin as one thickness of an associated powder layer, e.g., 10 µm, utilized during the additive formation process.

More specifically, still referring to FIG. 1, the illustrated additive manufacturing system 100 includes a powder supply chamber 102 that contains a supply of powder 104 and a build chamber 106 within which a component 108 may be additively manufactured in a layer-by-layer manner. For example, in certain embodiments, the component 108 may be an air-foil separator or a heat exchanger for a gas turbine engine. In further embodiments, the component 108 may be any suitable part that can benefit from additive manufacturing technology.

The powder supply chamber 102 includes a powder piston 110 which elevates a powder floor 112 during operation of the system 100. As the powder floor 112 elevates, a portion of the powder 104 is forced out of the powder supply chamber 102. A recoater 114 such as a roller or a blade pushes some of the powder 104 across a work surface 116 and onto a build platform 118. The recoater 114 sequentially distributes thin layers of powder 104 onto the build platform 118. An energy source 120 directs an energy beam 122 such as a laser or an electron beam onto the thin layer of powder 104 to melt or fuse the sequential layers of powder 104. Any suitable laser and laser parameters may be used, including considerations with respect to power, laser beam spot size, and scanning velocity. The build material may be formed by any suitable powder or material selected for enhanced strength, durability, and useful life, particularly at high temperatures. Typically with a DMLM, EBM, or SLM system, the powder 104 is fully melted, with respective layers being melted or re-melted with respective passes of the energy beam 122. Conversely, with DMLS, or SLS systems, layers of powder 104 are sintered, fusing particles of powder 104 with one another generally without reaching the melting point of the powder 104.

A scanner 124 controls the path of the beam so as to melt or fuse only the portions of the layer of powder 104 that are to become part of the component 108. The first layer or series of layers of powder 104 are typically melted or fused to the build platform 118, and then sequential layers of powder 104 are melted or fused to one another to additively manufacture the component 108. The first several layers of powder 104 that become melted or fused to the build platform 118 may define a support structure 126 for the component 108. As sequential layers of powder 104 are melted or fused to one another, a build piston 128 gradually lowers the build platform 118 so as to make room for the recoater 114 to distribute sequential layers of powder 104. Sequential layers of powder 104 may be melted or fused to the component 108 until a completed component 108 has been fabricated.

Generally, the support structure 126 provides a surface to which sequential layers of powder 104 may be melted or fused, while holding the sequential layers of melted or fused powder in position while resisting residual stresses caused by rapid changes in temperature as the energy beam 122 melts or fuses the sequential layers of powder 104. The support structure 126 also provides a thermally conductive pathway to dissipate heat generated by the energy beam 122. Typically, the support structure 126 may be fabricated in the same manner as the component 108. In some embodiments, the same powder 104 may be used to fabricate the support structure 126 and the component 108. Alternatively, in some embodiments, a different powder 104 may be used for the support structure 126 and the component 108. When forming the support structure 126, the energy beam 122 typically melts or sinters the top surface of the build platform 118 together with the first few layers of powder 104 so as to securely weld (e.g., melt or fuse) the support structure 126 to the build platform 118. After the component 108 has been fabricated, the support structure 126 may be removed from the component 108 in post-fabrication processes. For example, the component 108 may be manually removed from the support structure 126 or cut away from the support structure 126 using an electrical discharge machine (EDM) (such as a wire-cut EDM).

As explained briefly above, the additive manufacturing process used in forming the component 108 may result in varying heat constants throughout the volume of the part due to geometric changes in the part as the part is being built up. Thus, the build quality of the part may be compromised in areas or layers requiring increased heat to melt or fuse the layer to previously-printed layers. In order to maintain the build quality of the component 108, the present disclosure is directed to methods for additively manufacturing components with improved control over heat distribution during the build up by geometrically equalizing the area layer by layer, thus equalizing and/or regulating the addition of heat as the part is built.

Figure 2:
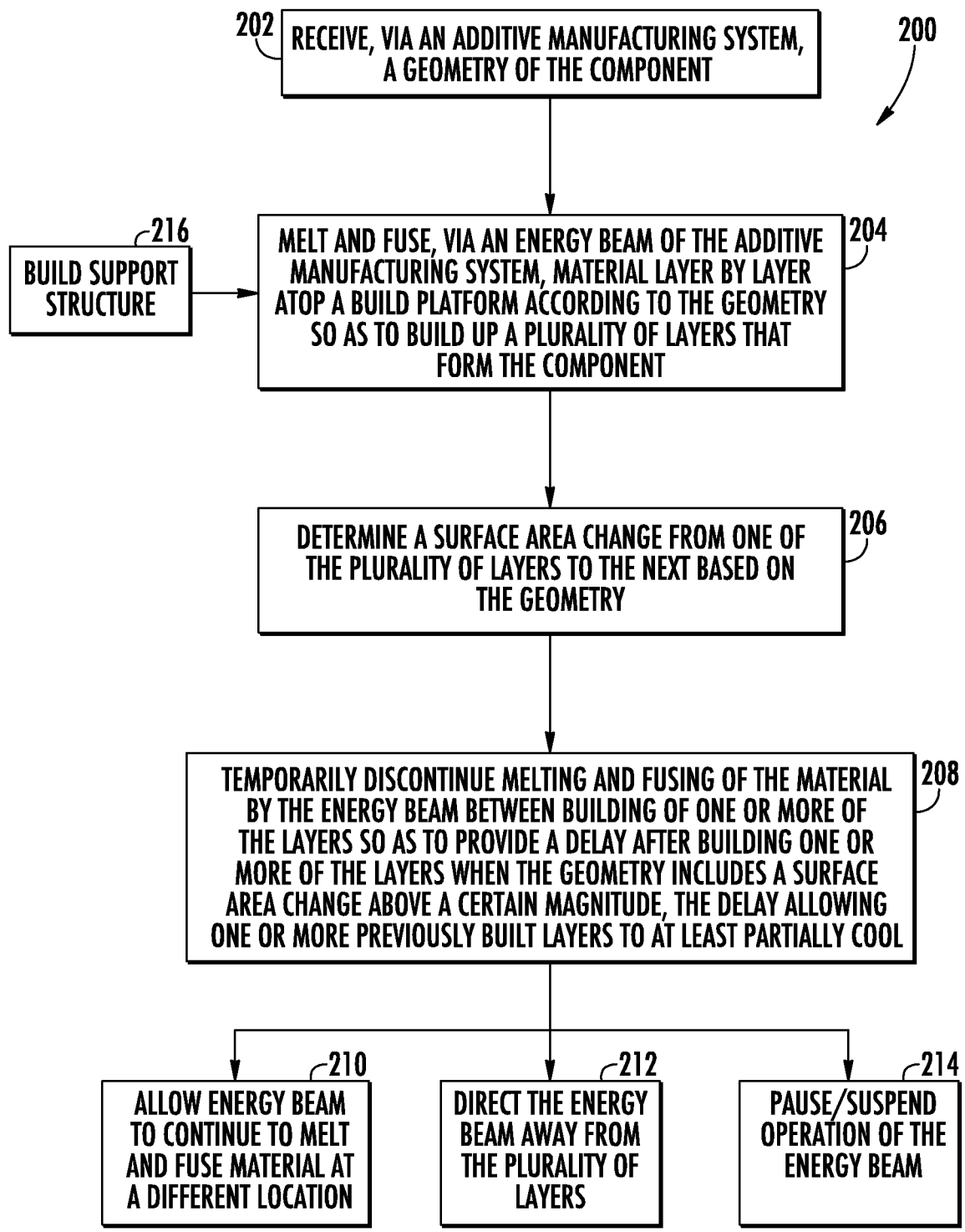
FIG. 2 illustrates a flow chart of one embodiment of a method for additively manufacturing a component according to the present disclosure.

Referring now to FIG. 2, a flow chart 200 of one embodiment of a method for additively manufacturing a component according to the present disclosure is illustrated. In general, the method 200 will be described herein with reference to the additive manufacturing system 100 and component 108 of FIG. 1. However, it should be appreciated that the disclosed method 200 may be implemented with additive manufacturing systems having any other suitable configurations. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include receiving, via the additive manufacturing system 100, a geometry of the component 100. More specifically, as mentioned, the additive manufacturing system 100 may be configured to generate a 3D computer model of the component 108 that includes the geometry (e.g. the shape, volume, dimensions, etc.) of the component 108. As shown at (204), the method 200 may include melting and fusing, via the energy beam 122 generated by the energy source 120 of the additive manufacturing system 100, material layer by layer atop the build platform 118 of the component 108 according to the geometry so as to build up a plurality of layers that form the component 108. As shown at (206), the method 200 may include determining a surface area change from one of the plurality of layers to the next based on the geometry. For example, in certain embodiments, the processor 132 is configured to determine a percentage increase of the surface area change from one of the plurality of layers to the next. In such embodiments, the method 200 may further include defining a plurality of groups of ranges of percentage increases and decreases. For example, example groups of ranges of the percentage increases may include 0-10% increase, 10-25% increase, and greater than 25% increase. Similarly, example groups of ranges of the percentage decreases may include 0-10% decrease, 10-25% decrease, and greater than 25% decrease. As such, the processor 132 is configured to select a group of ranges from the plurality of groups of ranges that includes the percentage increase or decrease.

As shown at (208), the method 200 may include temporarily discontinuing melting and fusing of the material by the energy beam 122 between building of one or more of the layers so as to provide a delay after building one or more of the layers when the surface area change is above a predetermined threshold. For example, in one embodiment, the method 200 may include temporarily discontinuing the melting and fusing of the material by the energy beam 122 between building of one or more of the plurality of layers so as to provide the delay after building one or more of the plurality of layers when the selected group of ranges is a certain magnitude above the predetermined threshold. In other words, surface area/slice area changes exceeding the predetermined threshold by a certain magnitude may be likely to cause a temperature variation during building that causes a build failure in the component 108. As such, the delay allows for previously built layer(s) to at least partially cool so as to eliminate and/or reduce build failures from occurring in the final component 108. In further embodiments, the method 200 may include determining the certain magnitude as a function of at least one of properties of the material, a power level of the energy beam 122, and/or historical data.

Still referring to FIG. 2, the processor 132 of the additive manufacturing system 100 may be configured to temporarily discontinue melting and fusing of the material in a variety of ways. For example, in one embodiment, as shown at 210, the method 200 may include allowing the energy beam 122 to continue to melt and fuse material at a different location from the plurality of layers so as to temporarily discontinue building of the component 108. In such embodiments, the method 200 may include co-melting and fusing, via the energy beam 122, additional material atop the build platform 118 in addition to the plurality of layers to provide further temperature balancing between the layers during building of the component 108. For example, in such embodiments, by printing more than one part at a time, the energy beam 122 can print one or more layers of a first component, then begin to print one or more layers of a second component, and so on, while circling back to print subsequent layers after the first layers have had a chance to cool. Further, in such embodiments, the method 200 may optionally include calculating a size, volume, and/or shape of the material to be melted and fused at the different location based on an amount of cooling needed for one or more of the layers. Accordingly, in such embodiments, the material to be printed at the different location may have the same size and/or shape as the component 108 or a different size and/or shape.

Still referring to FIG. 2, as shown at 212, the method 200 may also include directing the energy beam 122 away from the plurality of layers without melting and fusing any material to temporarily discontinue melting and fusing material to the build the component 108. For example, in such embodiments, the scanner/mirror 124 of the additive manufacturing system 100 is configured to direct the energy beam 122 away from the plurality of layers that form part of the component 108 so as to allow such layers to cool. In alternative embodiments, as shown at 214, the method 200 may also include simply pausing the energy beam 122 (i.e. without melting and fusing any material during the pause period) so as to temporarily discontinue melting and fusing of the material.

In additional embodiments, as shown at 216, the method 200 may optionally include melting and fusing, via the energy beam 122, additional material atop the build platform 118 before building the plurality of layers so as to build the support structure 126 for the component 108. In such embodiments, the support structure 126 may have a shape configured to provide both support for the component 108 and temperature balancing between the layers during building of the component 108.

After the printing process is complete, the method 200 may also include optionally subjecting the component 108 to various post-processing procedures. In this regard, for example, the component 108 may be placed into an oven for a high temperature treatment or annealing process. In addition, various surface treatments such as shot peening, machining, or polishing may be performed to create a desired surface finish. All of these procedures may be performed before or after removing the support structure 126.

Figure 3:
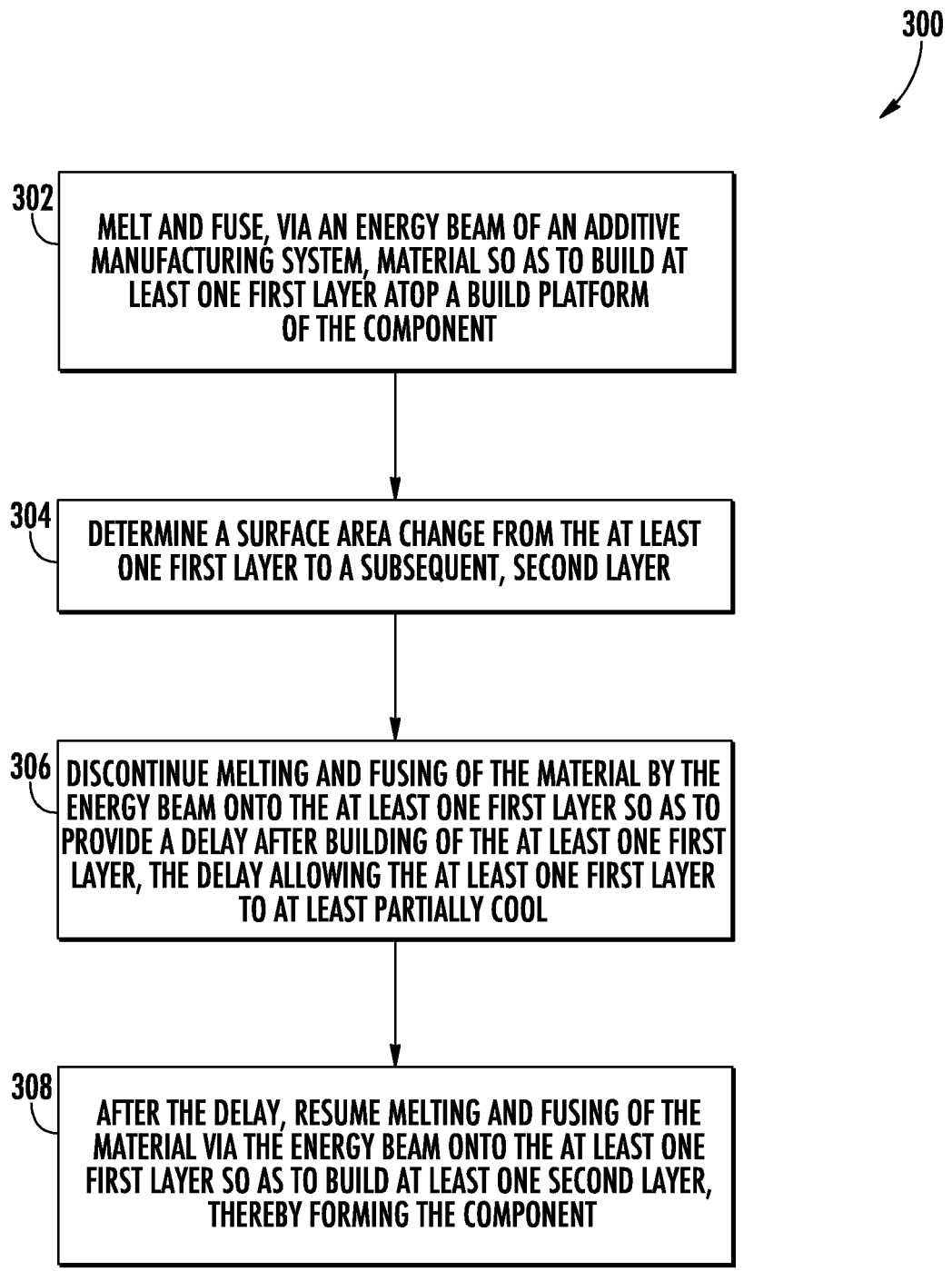
FIG. 3 illustrates a flow chart of another embodiment of a method for additively manufacturing a component according to the present disclosure.

Referring now to FIG. 3, a flow chart 300 of another embodiment of a method for additively manufacturing a component according to the present disclosure is illustrated. In general, the method 300 will be described herein with reference to the additive manufacturing system 100 and component 108 of FIG. 1. However, it should be appreciated that the disclosed method 300 may be implemented with additive manufacturing systems having any other suitable configurations. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (302), the method 300 may include melting and fusing, via the energy beam 122 of the additive manufacturing system 100, material so as to build at least one first layer atop the build platform 118 of the component 108. As shown at (304), the method 300 may include determining a surface area change from the at least one first layer to a subsequent, second layer. As shown at (306), the method 300 may include discontinuing melting and fusing of the material by the energy beam 122 onto the first layer(s) so as to provide a delay after building of the first layer(s). Further, a length of the delay may be determined as a function of the surface area change so as to allow the first layer(s) to at least partially cool. After the delay, as shown at (308), the method 300 may include resuming melting and fusing of the material via the energy beam 122 onto the first layer(s) so as to build the second layer, thereby forming the component 108.

The additive manufacturing methods described above enable much more complex and intricate shapes and contours of the components described herein, while also maintaining the build quality of the part. For example, such components may include thin additively manufactured layers and unique fluid passageways and part configurations. The successive, additive nature of the manufacturing process enables the construction of these novel features. As a result, the components described herein may exhibit improved performance and reliability.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for additively manufacturing a component, the method comprising:

receiving, via an additive manufacturing system, a geometry of the component, the geometry comprising a plurality of slices, each of the plurality of slices defining a cross-section of the component, wherein the plurality of slices comprises a first slice and a second slice, the second slice being adjacent to the first slice, wherein there is a difference between cross-sectional areas of the first slice and the second slice;

melting and fusing, via an energy beam of an energy source of the additive manufacturing system, material layer by layer atop a build platform of the component according to the geometry so as to build up a plurality of layers that form the component;

determining, via a processor, a percentage increase or decrease of a surface area change between the first slice and the second slice;

defining, via the processor, a plurality of groups of ranges of percentage increases and decreases;

selecting, via the processor, a group of ranges from the plurality of groups of ranges that includes the percentage increase or decrease, wherein the selected group of ranges from the plurality of groups of ranges is greater than a predetermined threshold; and determining a magnitude by which the selected group of ranges from the plurality of groups of ranges is above the predetermined threshold, wherein the melting and fusing of the material comprises temporarily discontinuing melting and fusing of the material by the energy beam for a delay period based on the magnitude such that one or more of the plurality of layers cools prior to melting and fusing additional layers on the one or more of the plurality of layers.

2. The method of claim 1, wherein the predetermined threshold is determined, via the processor, based on at least one of properties of the material, the group of ranges, a power level of the energy beam, or historical data.

3. The method of claim 1, wherein temporarily discontinuing melting and fusing of the material by the energy beam between building of one or more of the plurality of layers further comprises allowing the energy beam to continue to melt and fuse material at a different location away from the plurality of layers.

4. The method of claim 2, further comprising calculating, via the processor, a size, volume, and/or shape of the material to be melted and fused at the different location based on an amount of cooling needed for one or more of the plurality of layers.

5. The method of claim 1, wherein temporarily discontinuing melting and fusing of the material by the energy beam between building of one or more of the plurality of layers further comprises at least one of directing the energy beam away from the plurality of layers without melting and fusing any material or pausing the energy beam to prevent the energy beam from melting and fusing any material.

6. The method of claim 1, further comprising melting and fusing, via the energy beam, additional material atop the build platform before building the plurality of layers so as to build a support structure for the component, the support structure having a shape configured to provide both support for the component and temperature balancing between the plurality of layers during building.

7. The method of claim 1, wherein the additive manufacturing system utilizes at least one of selective laser melting, selective laser sintering, or electron beam melting for building the at least one first and/or second layers.

8. The method of claim 1, further comprising co-melting and co-fusing, via the energy beam, additional material atop the build platform in addition to the plurality of layers to provide further temperature balancing between the plurality of layers during building of the component.

9. A method for additively manufacturing a component, the method comprising:

melting and fusing, via an energy beam generated by an energy source of an additive manufacturing system, material so as to build at least one first layer atop a build platform of the component by moving the energy beam in a pattern based on a three-dimensional model of the component;

discontinuing melting and fusing of the material by the energy beam onto the at least one first layer so as to provide a delay after building of the at least one first layer such that the at least one first layer cools prior to melting and fusing a subsequent second layer, a length of the delay being determined, via a processor, by determining a percentage increase or decrease of a surface area change between the first slice and the second slice;

defining a plurality of groups of ranges of percentage increases and decreases; and selecting a group of ranges from the plurality of groups of ranges that includes the percentage increase or decrease, wherein the selected group of ranges from the plurality of groups of ranges is greater than a predetermined threshold;

determining a magnitude by which the selected group of ranges from the plurality of groups of ranges is above the predetermined threshold; and setting the length of the delay needed to equalize the surface area change between the first slice and the second slice based on the magnitude; and after the delay, resuming melting and fusing of the material via the energy beam onto the at least one first layer so as to build the second layer, thereby forming the component.

10. The method of claim 9, wherein the length of the delay is determined, via the processor, based on at least one of properties of the material, the selected group of ranges, a power level of the energy beam, or historical data.

11. The method of claim 9, wherein discontinuing melting and fusing of the material by the energy beam onto the at least one first layer further comprises allowing the energy beam to continue to melt and fuse material at a different location away from the at least one first layer.

12. The method of claim 11, further comprising calculating, via the processor, a size, volume, and/or shape of the material to be melted and fused at the different location based on an amount of cooling needed for the at least one first layer.

13. The method of claim 9, wherein discontinuing melting and fusing of the material by the energy beam onto the at least one first layer further comprises directing the energy beam away from the plurality of layers without melting and fusing any material.

* * * * *

UNITED STATES PATENT AND TRADEMARK OFFICE
CERTIFICATE OF CORRECTION

PATENT NO. : 11,396,046 B2  
APPLICATION NO. : 16/273513  
DATED : July 26, 2022  
INVENTOR(S) : Johnnattan Tennessee Ugarte et al.

Page 1 of 1

It is certified that error appears in the above-identified patent and that said Letters Patent is hereby corrected as shown below:

In the Specification

In Column 4, Line 16, after "according", insert --to--.

In the Claims

In Column 9, Line 43, amend Claim 4 to depend from claim 3.

In Column 10, Lines 24 and 25, Claim 9 replace "the first slice and the second slice" with "a first slice and a second slice".

In Column 10, Line 61, Claim 13 replace "the plurality of layers" with "the at least one first layer".

Signed and Sealed this  
Twenty-ninth Day of November, 2022

Katherine Kelly Vidal  
*Director of the United States Patent and Trademark Office*